United States Patent
Healy et al.

(10) Patent No.: US 11,847,217 B2
(45) Date of Patent: Dec. 19, 2023

(54) METHODS AND APPARATUS TO PROVIDE AND MONITOR EFFICACY OF ARTIFICIAL INTELLIGENCE MODELS

(71) Applicant: McAfee, LLC, Santa Clara, CA (US)

(72) Inventors: Sorcha Healy, Mahon (IE); Gerard Murphy, Mahon (IE); David McCormack, Mahon (IE); Cedric Cochin, Hillsboro, OR (US)

(73) Assignee: McAfee, LLC, San Jose, CA (US)

(*) Notice: Subject to any disclaimer, the term of this patent is extended or adjusted under 35 U.S.C. 154(b) by 301 days.

(21) Appl. No.: 16/917,402

(22) Filed: Jun. 30, 2020

(65) Prior Publication Data
US 2021/0406369 A1 Dec. 30, 2021

(51) Int. Cl.
*G06N 20/00* (2019.01)
*G06N 5/04* (2023.01)
*G06F 21/56* (2013.01)

(52) U.S. Cl.
CPC ............ *G06F 21/562* (2013.01); *G06N 5/04* (2013.01); *G06N 20/00* (2019.01); *G06F 2221/033* (2013.01)

(58) Field of Classification Search
CPC .. G06F 21/562; G06F 2221/033; G06F 21/56; G06N 20/00; G06N 5/04
See application file for complete search history.

(56) References Cited

U.S. PATENT DOCUMENTS

| | | | |
|---|---|---|---|
| 10,296,848 B1* | 5/2019 | Mars | G06N 20/20 |
| 10,824,721 B2* | 11/2020 | Kesarwani | G06N 20/00 |
| 11,308,418 B2* | 4/2022 | Schiemenz | G06N 20/00 |
| 2017/0032279 A1* | 2/2017 | Miserendino | G06N 20/00 |
| 2020/0125928 A1* | 4/2020 | Doyle | G06N 3/0445 |
| 2020/0202257 A1* | 6/2020 | Lee | G06K 9/6263 |
| 2020/0210899 A1* | 7/2020 | Guo | G06N 20/00 |

(Continued)

FOREIGN PATENT DOCUMENTS

| | | | |
|---|---|---|---|
| CN | 111144443 A | * | 5/2020 |
| CN | 111260081 A | * | 6/2020 |

(Continued)

OTHER PUBLICATIONS

Gonfalonieri, Alexandre, "Why Machine Learning Models Degrade in Production", posted on Jul. 25, 2019, retrieved from https://towardsdatascience.com/why-machine-learning-models-degrade-in-production-d0f2108e9214 on Jun. 5, 2020, 9 pages.

(Continued)

*Primary Examiner* — Jayesh M Jhaveri
(74) *Attorney, Agent, or Firm* — HANLEY, FLIGHT & ZIMMERMAN LLC

(57) ABSTRACT

Methods, apparatus, systems, and articles of manufacture to provide and monitor efficacy of artificial intelligence models are disclosed. An example apparatus includes a model trainer to train an artificial intelligence (AI) model to classify malware using first training data; an interface to deploy the AI model to a processing device; a model implementor to locally apply second training data to the AI model to generate output classifications, the second training data generated after generation of the first training data; and a report generator to generate a report including an efficacy of the AI model based on the output classifications.

29 Claims, 6 Drawing Sheets

(56) References Cited

U.S. PATENT DOCUMENTS

| | | | |
|---|---|---|---|
| 2021/0027103 A1* | 1/2021 | Brower | G06K 9/6257 |
| 2021/0209512 A1* | 7/2021 | Gaddam | G06F 21/56 |
| 2021/0224486 A1* | 7/2021 | Stabler | G06F 18/2148 |
| 2021/0279336 A1* | 9/2021 | Cmielowski | G06N 3/045 |

FOREIGN PATENT DOCUMENTS

| | | | | |
|---|---|---|---|---|
| CN | 113795194 A | * | 12/2021 | A61B 5/1116 |
| TW | 201734825 A | * | 10/2017 | G01N 21/9501 |

OTHER PUBLICATIONS

Vanerio et al., "Ensemble-learning Approaches for Network Security and Anomaly Detection," in Proceedings of Big-DAMA '17, Los Angeles, CA, USA, Aug. 21, 2017, 6 pages.

\* cited by examiner

METHODS AND APPARATUS TO PROVIDE AND MONITOR EFFICACY OF ARTIFICIAL INTELLIGENCE MODELS

FIELD OF THE DISCLOSURE

This disclosure relates generally to artificial intelligence, and, more particularly, to methods and apparatus to provide and monitor efficacy of artificial intelligence models.

BACKGROUND

Malware (e.g., viruses, worms, trojans, ransomware) is malicious software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

Figure 1:
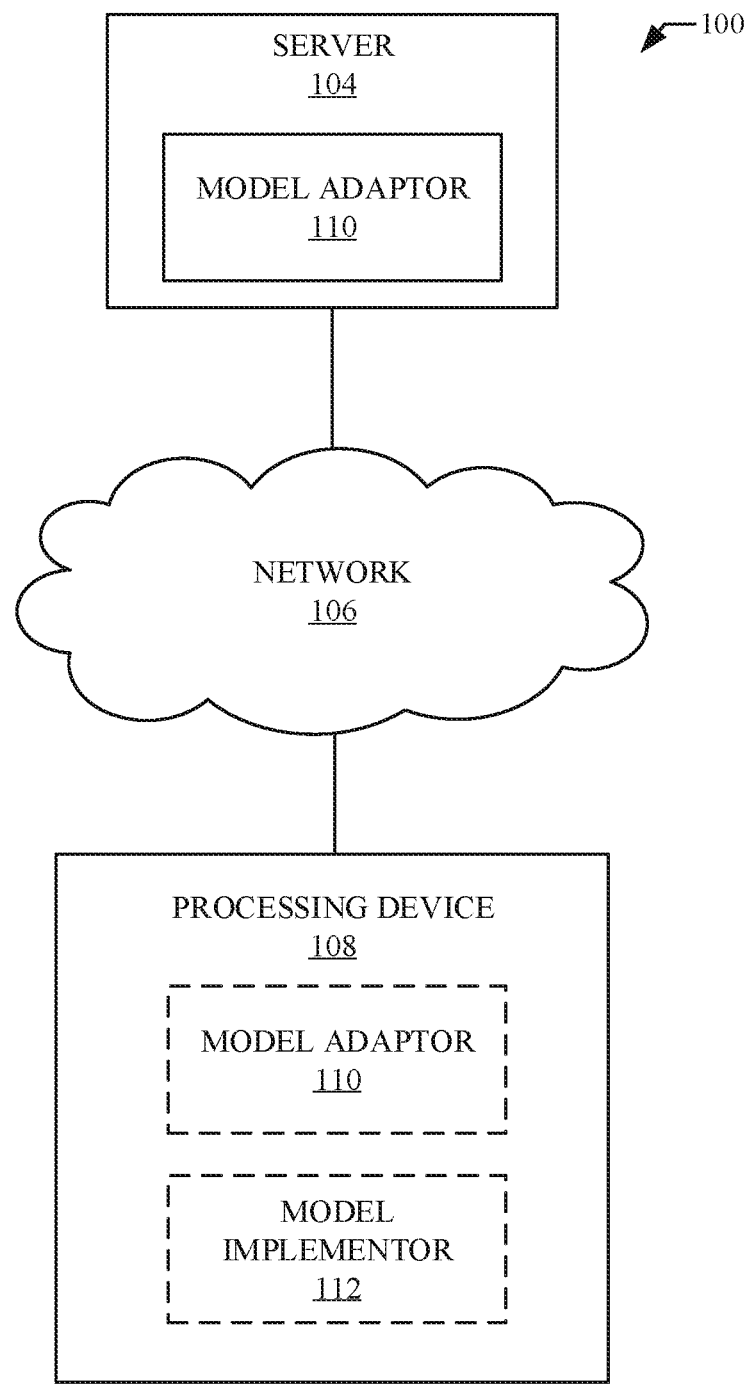
FIG. 1 illustrates an example malware monitoring environment structured according to the teachings of this disclosure to classify malware using artificial intelligence.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An artificial intelligent (AI) model (e.g., a machine learning (ML), deep learning (DL), and/or other AI-based approach) may be utilized to identify malware. Such malware detection may be performed using a supervised ML and/or other unsupervised ML models and deep learning (DL) algorithms such as, for example, a convolutional neural network (CNN), a recurrent neural network (RNN), a machine learning algorithm etc., configured to be trained using input data with known (e.g., an expected classification of the model) classifications. For example, the input data may be files that are known to be malware or non-malware. The AI model is trained using the input data to be able to classify whether a file is malware or not.

After a trained model is deployed, the trained model operating in a real world environment is vulnerable to adversarial activity. Adversarial activity causes the data distribution for a model (e.g., the type of data that the model sees or inputs) to change over time, corresponding to concept drift because the type of data used to train the model no longer corresponds to the type of data that the deployed model is being used to classify. As used herein, concept/model drift occurring with malware, or malware concept/model drift, refers to any change in malware properties over time. For example, an approach utilizing a supervised or an unsupervised ML and/or AI model to detect malware may be trained to detect malware that performs a specific function. If such a specific function is altered over time, the trained supervised or unsupervised ML and/or AI models may not reliably detect such a concept drift. Additionally, model drift may be the result of an adversarial attack on a trained model. Accordingly, after deployment a trained model can start to degrade, thereby generating less and less accurate results (e.g., decreasing efficacy). Degraded models output inaccurate results, which corresponds to a higher rate of misclassification of input files or input data. New or different models are needed to replace or update degraded models to maintain accurate malware protection.

AI models can be structured in a variety of ways. For example, a malware classification model can be implemented using an AI model, a ML model, a DL model, a neural network, etc. Additionally, AI models can be structured differently. For example, different neural networks can have different numbers of layers, different order of layers, different number of neurons, etc. Each AI model type and/or structure corresponds to different complexities, different classification speeds, different resource consumption to implement, different amount of memory to store, etc. Additionally, AI models can be trained to perform different tasks (e.g., identify one or more types of malware) with different amount of accuracy (e.g., 80% accurate, 95% accurate, 99% accurate, etc.). A user may desire a first type of trained model at a first point in time and may desire a second type of trained model at a second point in time. For example, a user may request a model that is trained to identify a particular type of malware using no more than a threshold amount of one or more resources. However, if the device implementing the model has excess resources that are not being used (e.g., the device is underutilized), the user may want to change the model to increase the amount of resources being used to increase the accuracy and/or speed of the malware classification.

Examples disclosed herein generate and store multiple different models for a malware classification in a model database. The multiple models may correspond to different malware classifications, different accuracies, different amounts of time to classify, different amounts of resource consumption, etc. In this manner, a user has multiple options for a model and, when the user wants to change or upgrade a previously deployed model, other models are already ready to be deployed. Additionally, examples disclosed herein periodically test the generated models with new training data (e.g., new data that have been verified to be or to not be malware) to be able to provide the user with efficacy information corresponding to the selected model and/or other previously trained models with corresponding information regarding the speed, accuracy, resource consumption (e.g., processor resources, memory, etc.), etc. Some examples disclosed herein monitor telemetry data from a device of the user to suggest model(s) for the user based on the capacity and use of the device. Examples disclosed herein provide feedback to users about the accuracy of malware classification models to allow user to reconfigure and/or select new models to ensure the most up-to-date malware protection for the computing devices of the user. Although examples disclosed herein correspond to a malware classification model, examples disclosed herein may be described in conjunction with any time of classification model.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. In general, machine learning models/architectures that are suitable to use in the example approaches disclosed herein will be neural network based models (e.g., convolution neural network (CNN), deep neural network (DNN), etc.) including explainability to be able to determine which factors were important for the neural network based model in generating an output, of a graph neural network (GNN) that provides some insight into the inner structure of the network model. However, other types of machine learning models could additionally or alternatively be used such as deep learning and/or any other type of AI-based model.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs). As used herein, inputs with corresponding labeled outputs is referred to as training data.

In examples disclosed herein, ML/AI models are trained using data and/or files that have been labelled as "malware" or "non-malware" from servers in a network. However, any other training algorithm may additionally or alternatively be used. In examples disclosed herein, training is performed until an acceptable amount of error is achieved. In examples disclosed herein, training is performed at a server of a controlling entity and/or by a user of a processing device. Training is performed using hyperparameters that control how the learning is performed (e.g., a learning rate, a number of layers to be used in the machine learning model, etc.). In some examples re-training may be performed. Such re-training may be performed in response to additional training data.

Training is performed using training data. In examples disclosed herein, the training data originates from processing devices and/or servers on a network. Because supervised training is used, the training data is labeled. Labeling is applied to the training data by the entity, the server, or a user of a processing device.

Once training is complete, the model is deployed for use as an executable construct that processes an input and provides an output based on the network of nodes and connections defined in the model. The model is stored at the server of the entity. The model may then be executed by a processing device and/or a server to classify malware based on input data and/or filed.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 illustrates an example malware model deployment environment 100. The example malware model deployment 100 of FIG. 1 includes an example server 104, an example network 106, and an example processing device 108, an example model adaptor 110, and an example model implementor 112. The example model adaptor 110 may be implemented in the server 104, the processing device 108, and/or in both (e.g., some functionality in the server 104 and some functionality in the user device 108). Although FIG. 1 includes a single server 104 and a single processing device 108, examples disclosed herein may be described in conjunction with multiple servers and multiple processing devices. For example, a user can request different models to be deployed to different processing devices. In such an example, the user can make a request to the one or more servers to deploy the one or more models to the one or more processing devices.

The server 104 of FIG. 1 is a computing device that can train models, implement models, deploy models, and/or deploy software (e.g., an application, an application programmable interface (API), an executable, etc.) to the processing device 108 to implement the model implementor 112. In some examples, the server 104 is a cloud-based server (e.g., implemented in a private and/or public cloud). In some examples, when the model adaptor 110 is implemented in the server 104, the server 104 can train, store, and deploy models to the processing device 108, as further described below. In some examples, when the model adaptor 110 is to be implemented (e.g., partially or fully) in the processing device 108, the server 104 may transmit software (e.g., an application, an executable, etc.) to the processing device 108 to implement the model adaptor 110 locally at the processing device 108. In some examples, when the model adaptor 110 is partially implemented in the server 104 and partially implemented in the processing device 108, the processing device 108 trains multiple models and transmits the trained models to the server 104 and/or a remote database to be stored locally at the server 104 and/or the remote database. In this manner, the model adaptor 110 of the server 104 can implement the multiple models to test accuracy and/or efficacy of the models at the server 104 using up-to-date training data to determine if the deployed model has been degraded by more than a threshold.

The example network 106 of FIG. 1 is a system of interconnected systems exchanging data between the server 104 and processing devices (e.g., including the processing device 108). The example network 106 may be implemented using any type of public or private network such as, but not limited to, the Internet, a telephone network, a local area network (LAN), a cable network, and/or a wireless network. To enable communication via the network 106, the example processing device 108 and/or the server 104 includes a communication interface that enables a connection to an Ethernet, a digital subscriber line (DSL), a telephone line, a coaxial cable, or any wireless connection, etc.

The example processing device 108 of FIG. 1 may be a computer, a laptop, a tablet, a smart phone, a personal processor, a server, and/or any other type of processing device. The example processing device 108 obtains software (e.g., an executable, an application, an API, etc.) to enable the processing device 108 to download, install, and/or implement all or part of the model adaptor 110. In some examples, when the model adaptor 110 is not implemented in the processing device 108, the processing device 108 can interface (e.g., via an interface, a browser, an API, etc.) with the server 104 to be able to request one or more models from the server 104, receive model options from the server 104, request one or more of the model options from the server 104, received trained model(s) from the server 104, provide telemetry data to the server 104, and/or received model reports from the server 104. In some examples, a user can interface with the server 104 using another processing device and instruct the server 104 to deploy software (e.g., to interface and/or to implement the model adaptor 110) and/or trained model(s) to the processing device 108 via the network 106. In some examples, the processing device 108 may transmit its own training data to the example server 104 (e.g., in a private or public cloud) so that the server 104 can train the model(s) based on the user's own training data. In some examples, the processing device 108 transmits telemetry data to the example server 104. The telemetry data may include how much processor resources, memory, etc. are consumed while implementing the model, the time it takes to implement the model, software errors, processing device speed, amount of available resources (e.g., processor resources, memory, etc.) while implementing the model, etc. In this manner, the server 104 can make suggestions for different models based on the telemetry data, as further described below.

The example model adaptor 110 of FIG. 1 trains different models to classify data and/or files as one or more types of malware based on training data. Training data is data and/or files that have correctly been labelled as a type of malware and/or as non-malware. For example, the model adaptor 110 may utilize 10,000 files that have already been correctly identified as "non-malware" or "malware." The model adaptor 110 may utilize all or part of the dataset to train a model (e.g., a ML model, a DL model, a neural network, and/or any other type of AI-based model) to learn to classify data and/or files based on the characteristics of the data and/or files and corresponding classification in the known data set. For example, the model adaptor 110 can use a first set of training data to train one or more models (e.g., adjusting weights or neurons) to output the classifications of the corresponding training data when the data and/or file is input to the model. In such an example, the model adaptor 110 can use a second set of the training data to test the initially trained model (e.g., by using the data and/or file as inputs and comparing the output classifications with the known classifications). If the error (e.g., percentage of misclassification) is above a threshold, the model can be tuned (e.g., further trained) based on additional training data until the error is reduced below a threshold.

In some examples, the model adaptor 110 of FIG. 1 trains the models based on training data stored in the server 104. The model adaptor 110 may use the stored training data that corresponds to characteristics of the processing device 108 and/or the data provided by a user (e.g., industry of use, geolocation of the processing device 108, characteristics (e.g., operating system, applications, etc.) of the processing device 108, etc.) as part of the model request. For example, if the user requests a model to classify a particular type of malware in the healthcare industry, the model adaptor 110 may select training data that corresponds to the particular type of malware and the healthcare industry. In this matter, the models are trained using data that is more likely to be seen by and/or affect the processing device 108, leading to more relevant classifications. In some examples, the user and/or the processing device 108 transmits its own training data to the model adaptor 110 to train the models based on the provided training data.

The example model adaptor 110 of FIG. 1 uses the training data to train different types of models that correspond to different amount of resource consumption, accuracy, classification types, model types, speed, etc. For example, the model adaptor 110 may be trained to classify one type of malware or multiple types of malware. Additionally or alternatively, the model adaptor 110 may be train different model types (e.g., a ML model, a DL model, a neural network, and/or any other type of AI-based model). Different model types may correspond to different resources (e.g., processor resources, memory, etc.) to implement, different classification speed, etc. Additionally or alternatively, the model adaptor 110 can develop models with different amount of complexity (e.g., number of layers, number of neurons, structure of the model and/or layers, etc.), which correspond to different resource consumption to implement, different classification speeds, etc. In this manner, the example model adaptor 110 can provide the user with multiple options for one or more model(s) to classify malware in the processing device 108. Once trained, the example model adaptor 110 provides the model options and corresponding information (size of model, speed of model, resource consumption to execute, etc.) to a user via an interface (e.g., implemented in the processing device 108 or another device). The user can select one or more models to be deployed to the example processing device 108. The model adaptor 110 deploys the selected model(s) to the processing device 108 and stores all the trained models, including the models not selected by the user. The models may be stored at the server 104, at the processing device 108, and/or another device. For example, if the model adaptor 110 develops the models at the processing device 108, the processing device 108 may store the models locally or may transmit the trained models to the server 104 via the network 106 to be stored in the server 104.

After the model adaptor 110 of FIG. 1 stores the models, the model adaptor 110 retests the stored models periodically, aperiodically, or based on a trigger (e.g. a user request, more than a threshold amount of new training data being received, etc.) using new training data (e.g., training data received and/or generated after the model(s) was/were trained). For example, after a threshold amount of new training data is obtained and/or generated, the model adaptor 110 inputs new training data into the stored model(s) and compares the output classification to the known classification of the training data to determine the accuracy and/or efficacy of the deployed model. The model adaptor 110 compares the accuracy and/or efficacy to a threshold to determine if the deployed model has degraded by more than a threshold amount. If the model has degraded more than a threshold amount, the model adaptor 110 generates a report for the user to report that the model has been degraded, suggest a different model, and/or suggest training a new model. In some examples, the model adaptor 110 uses telemetry data of the processing device 108 to suggest a different model from the stored models when the processing device 108 has capacity (e.g., processor resources, memory, etc.) to implement a more complex and/or more accurate model. In some examples, the model adaptor 110 uses the telemetry data of the processing device 108 to suggest a different model from the stored models when the processing device 108 is being under or over utilized. The example model adaptor 110 is further described below in conjunction with FIG. 2.

Figure 2:
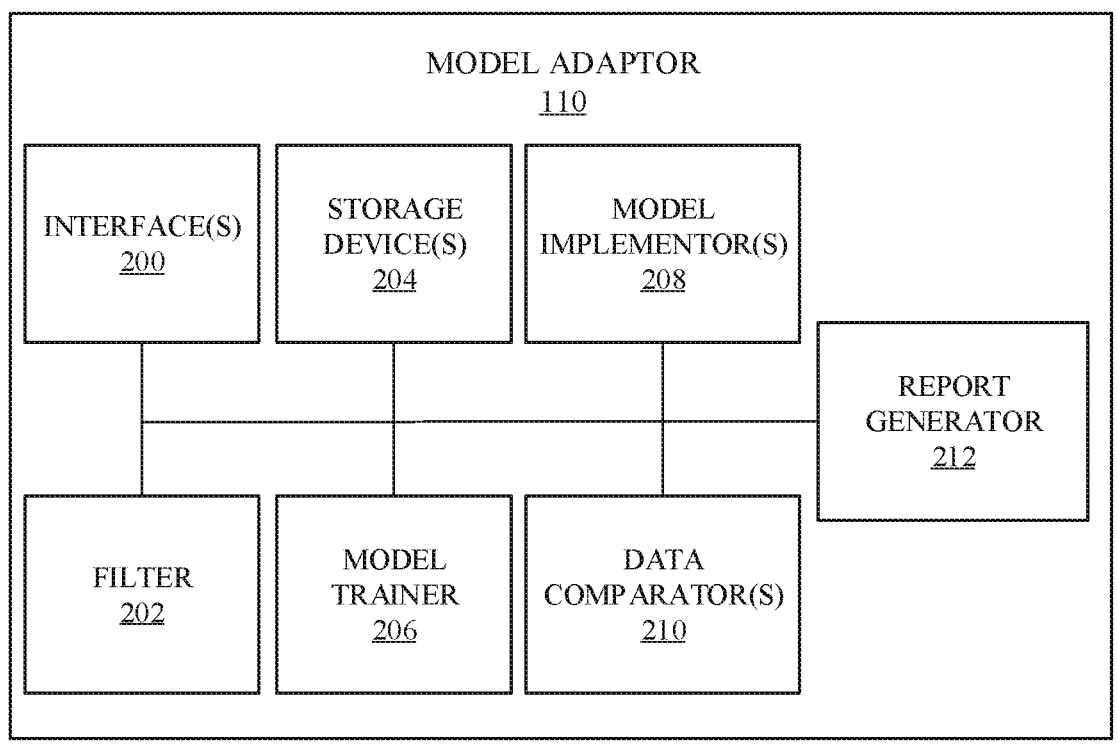
FIG. 2 is a block diagram of an example implementation of the model adaptor of FIG. 1.

The example model implementor 112 of FIG. 2 implements a trained and/or deployed model to take input data and/or input files and classify the data and/or files as malware or non-malware. For example, the model implementor 112 obtains data from the model adaptor 110 corresponding to how to implement a deployed model (e.g., how to weight neurons of a neural network) so that the deployed model is implemented at the processing device 108. In some examples, the model implementor 112 may be included in the model adaptor 110 (e.g., when the model adaptor 110 is implemented in the processing device 108). In such examples, the model adaptor 110 can implement a deployed model and test previously generated models.

As described above, the example model adaptor 110 may be implemented in the server 104, the processing device 108, and/or another processing device. For example, the model adaptor 110 may be implemented in the processing device 108 to train of the models locally at the processing device 108 using local training data. In such an example, the processing device 108 may implement a selected model using the model implementor 112 and transmit the trained models to the server 104 and the model adaptor 110 of the server 104 can test the models after deployment to identify when the deployed models should be updated, switched with other models, and/or retrained. In some examples, the model adaptor 110 is implemented in a second processing device (e.g., which deploys model data for selected model(s) to the processing device 108 to be implemented by the model implementor 112). In this manner, the model adaptor 110 can be implemented in a private network with the processing device 108 to keep internal data private and not requiring the processing device 108 from storing trained models and testing stored models.

FIG. 2 is block diagram of an example implementation of the model adaptor 110 of FIG. 1. The example model adaptor 110 includes an example interface 200, an example filter 202, example storage device(s) 204, an example model trainer 206, example model implementor(s) 208, example data comparator(s) 210, and an example report generator 212.

The example interface 200 of FIG. 2 may be and/or include a component interface and/or a network interface. For example, if the model adaptor 110 is implemented within the processing device 108, the interface(s) 200 may be and/or include a component interface to interface with a user interface of the processing device 108 to obtain user defined data, and/or to interface with other components of the processing device 108 to obtain telemetry data. If the model adaptor 110 is implemented within the processing device 108, the interface(s) 200 may be and/or include a network interface to interface with the server 104 and/or the other devices via the network 106 to obtain/transmit data, telemetry data, instructions, software, executables, applications, models, requests, training data, reports, etc. If the model adaptor 110 is implemented in the server 104, the interface(s) 200 may be and/or include a network interface to interface with the processing device 108 and/or other processing devices via the network 106 to transmit and/or obtain data, telemetry data, instructions, software, executables, applications, models, requests, training data, reports, etc. If the model adaptor 110 is implemented in the server 104, the interface(s) 200 may be and/or include a component interface to interface with components of the server 104 to obtain training data stored locally.

The example filter 202 of FIG. 2 filters global training data (e.g., training data generated by an entity that owns and/or operates the server 104) to correspond to data that will be input into a deployed model at the processing device 108. The server 104 stores and/or receive global training data that corresponds to data and/or files that have been correctly labelled as "malware" or "non-malware." However, the global training data may not be relevant or commonly seen at the processing device 108. For example, particular types of malware may be prevalent to particular geolocations, particular operating systems, and/or particular industries and not prevalent to other geolocations, operating systems, and/or industries. Accordingly, the model adaptor 110 may filter out training data that is not prevalent to the geolocation of the processing device and/or industry in which the processing device 108 is implemented. Additionally, if the user requests only a particular type of malware to be classified, the example model adaptor 110 may filter out classifications that do not correspond to the particular type of malware. Additionally, the example filter 202 may filter out training data that is older than a threshold amount of time. For example, when testing the accuracy of an already deployed model at some point of time after the model has been trained, the example filter 202 may filter out training data that was created before the model was trained.

The example storage device(s) 204 of FIG. 2 store(s) the validated training data (e.g., training data generated by or obtained at the server 104 and/or training data provided by the user) in conjunction with data corresponding to the training data (e.g., timestamp for when the training data was generated, relevant geolocations for the training data, relevant industries for the training data, type of malware to classify for the training data, etc.). In this manner, the filter 202 can filter the stored training data to train and/or test one or more models based on user preferences and/or resources. Additionally, the example storage device(s) 204 may store trained model data. The trained model data corresponds to the parameters for implementing a trained model (e.g., weights for neurons, algorithms, etc.). In this manner, the model implementor(s) 208 can implemented the trained models based on new training data to test a trained model after it is deployed to identify model accuracy and/or efficacy. The example storage device(s) 204 may be separate storage devices (e.g., one for the training data, one for trained model data), may be a single storage device (e.g., for both the training data and/or the trained model data), and/or any combination thereof.

The example model trainer 206 of FIG. 2 trains the models (e.g., AI model(s), neural network(s), machine learning model(s), deep learning model(s), convolution neural network(s), another type(s) of AI-based model(s) and/or network(s)) stored in the example storage device(s) 204. Initially, a model(s) is/are untrained (e.g., the neurons are not yet weighted). The example model trainer 206 of FIG. 2 trains one or more models based on known (e.g. validated) training data (e.g., with data and/or files as inputs and corresponding known classifications as desired outputs). In some examples, the example model trainer 206 weights parameters of one or more models (e.g., neurons of a neural network) to configure the models to classify the input data and/or files as one or more types malware or non-malware. As described above, the model trainer 206 may train a model with a first set of training data and test the model with a second set of the training data. If, based on the results of the testing, the accuracy of the model is below a threshold, the model trainer 206 can tune (e.g., adjust, further train, etc.) the parameters of the model using additional sets of the training data and continue testing until the accuracy is above the threshold. The example model trainer 206 can structure the model(s) to have different structures, different number of layers, different amount of accuracy, etc. for the same type of model and/or different types of models, thereby training a plurality of different models that have different advantages and disadvantages. The plurality of models provides a plurality of options for the user based on the preferences, capacity, and/or needs of the user and/or the processing device 108. After the interface(s) 200 receive a model request from a user, the model trainer 206 trains multiple different models based on corresponding training data (e.g., the customer provided training data and/or global training data that has been filtered, as described above). After the user selects one or more trained models, the interface 200 deploys trained model data for the selected trained model(s) to be implemented at the processing device 108 (e.g., using the model implementor 110) and the model trainer 206 stores the trained model data for all the trained model in the storage device(s) 204.

Once model(s) are deployed, the example model implementor(s) 208 of FIG. 2 can test the trained models (e.g., using the trained model data in the storage device(s) 204) with new and/or additional training data to (a) identify when a deployed model has degraded by more than a threshold amount and/or (b) suggest a different model and/or suggest retraining based on model degradation and/or telemetry data. For example, the model implementor(s) 208 may test a deployed model with new training data and determine that the accuracy of the model has dropped below a threshold. In such an example, the model implementor(s) 208 can test other trained models that were selected by the user with the new training data to see if an already trained model corresponds to an accuracy above the threshold. In this manner, the report generator 212 can suggest whether another model may be used or if a new model needs to be trained to fix the accuracy and/or efficacy issues with the currently deployed model. The model implementor(s) 208 may be one model implementor to implement multiple models or multiple model implementor(s) 208 to implement multiple models in parallel. When the example model adaptor 110 is implemented in the example processing device 108, the model implementor(s) 208 may be or include the example model implementor 112 of FIG. 1.

The example data comparator(s) 210 of FIG. 2 compare(s) data. For example, when training a model, the data comparator(s) 210 compares the result classification of a model when training data is input into the model to a known classification of the training data to determine whether the model classified the input data correctly or incorrectly. Additionally, during training or during testing of deployed models, the data comparator(s) 210 calculates the accuracy of the model based on the number of correct classification and the number of misclassifications. The data comparator(s) 210 may be one data comparator do all comparisons or may be multiple data comparator(s) 210 to multiple comparisons. When the data comparator(s) 210 are determining efficacies for multiple models, the data comparator(s) 210 may be multiple comparators to compare determine the multiple efficacies of the multiple models in parallel.

The example report generator 212 of FIG. 2 generates a report for displaying model options for a user based on a request from the user and/or generates a report identifying the accuracy and/or efficacy of deployed models and/or suggestions for other models (or for training new models) that may better suit the needs of the user. The report can include data related to the efficacy and/or accuracy of the deployed model, details related to other previously trained models, computer resource information when implementing one or more models, suggestions to train a new model. The report may be a document and/or a data packet that includes the report. The example interface 200 can transmit the report to a device of the client (e.g., the processing device 108 and/or another processing device via a pop-up, an email, a text message, and/or any other way to transmit data to the user) via the network 106. In this manner, the user can be exposed to the efficacy of the deployed models, the use of the resources when implementing the deployed models, options for other models and/or training new models, etc.

While an example manner of implementing the example model adaptor 110 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example interface 200, the example filter 202, the example storage device(s) 204, the example model trainer 206, the example model implementor(s) 208, the example data comparator(s) 210, the example report generator 212, and/or, more generally, the example model adaptor 110 of FIGS. 1 and/or 2 may be implemented by hardware, software, firmware and/or any combination of hardware, software and/or firmware. Thus, for example, any of the example interface 200, the example filter 202, the example storage device(s) 204, the example model trainer 206, the example model implementor(s) 208, the example data comparator(s) 210, the example report generator 212, and/or, more generally, the example model adaptor 110 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example filter 202, the example storage device(s) 204, the example model trainer 206, the example model implementor(s) 208, the example data comparator(s) 210, the example report generator 212, and/or, more generally, the example model adaptor 110 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model adaptor 110 of FIGS. 1 and/or 2 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
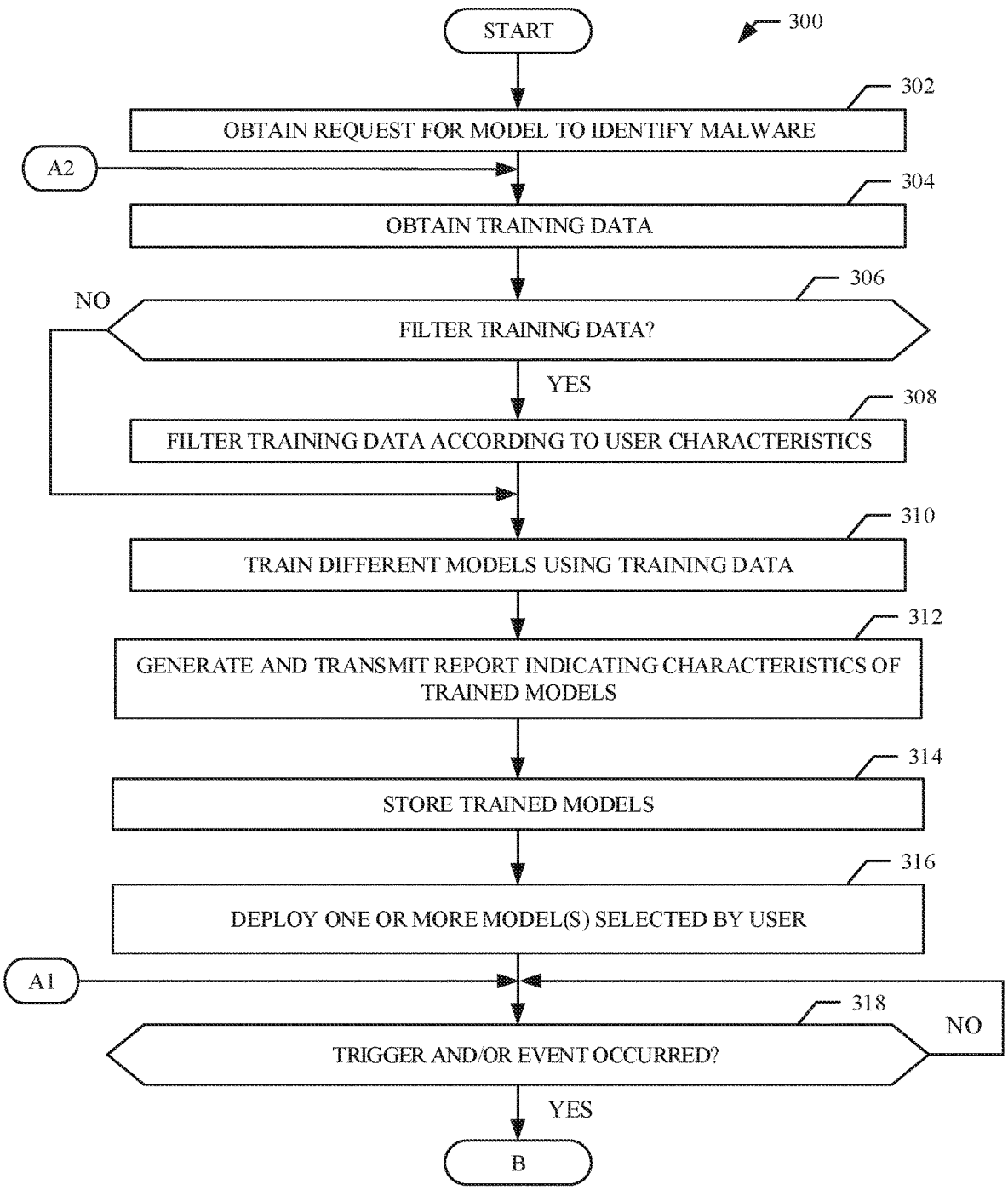
FIGS. 3A-3C illustrate a flowchart representative of machine readable instructions which may be executed to implement the model adaptor of FIGS. 1 and/or 2 to train a model to classify malware and monitor the degradation of the model.
Figure 3B:
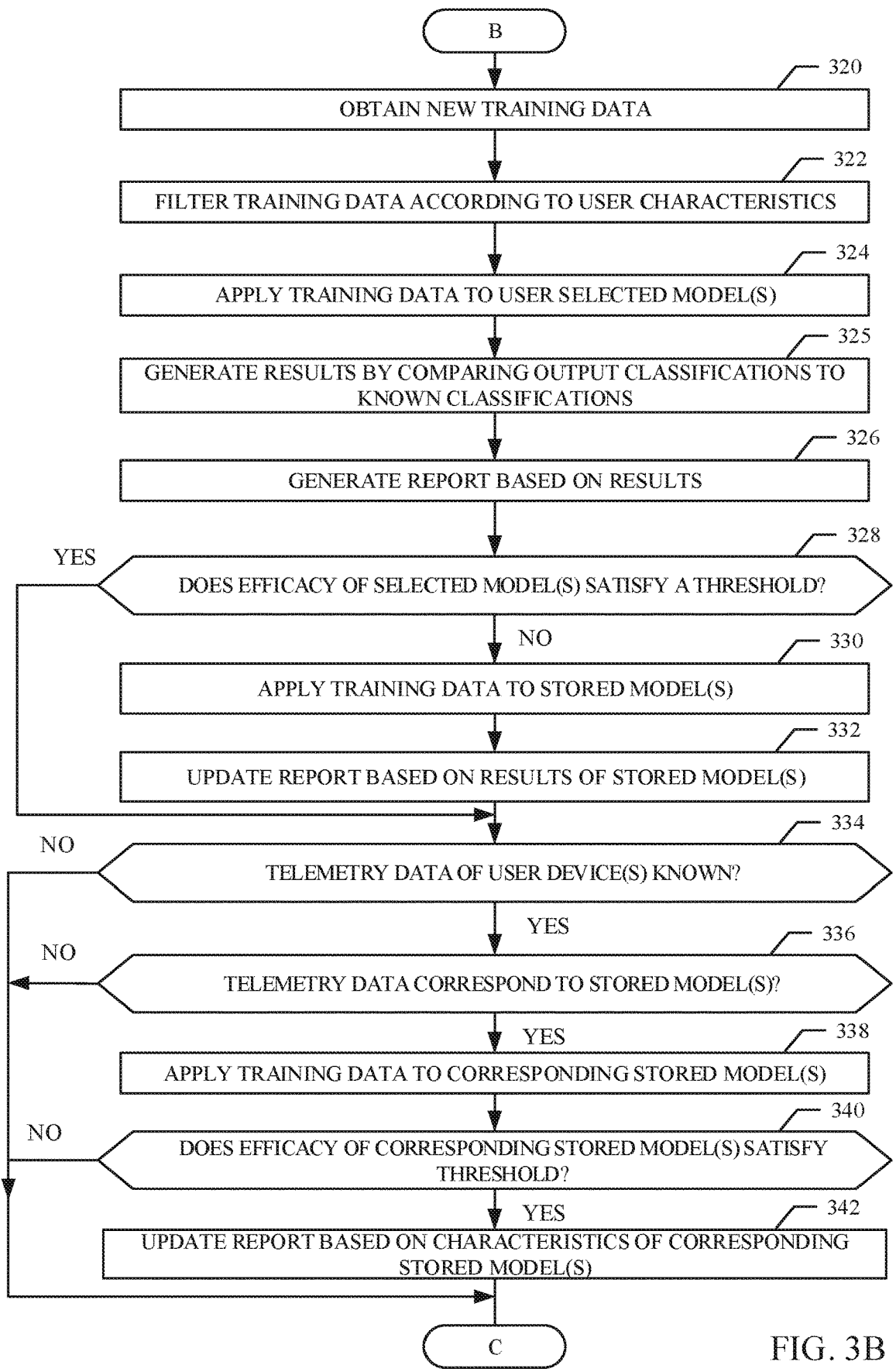
Figure 3C:
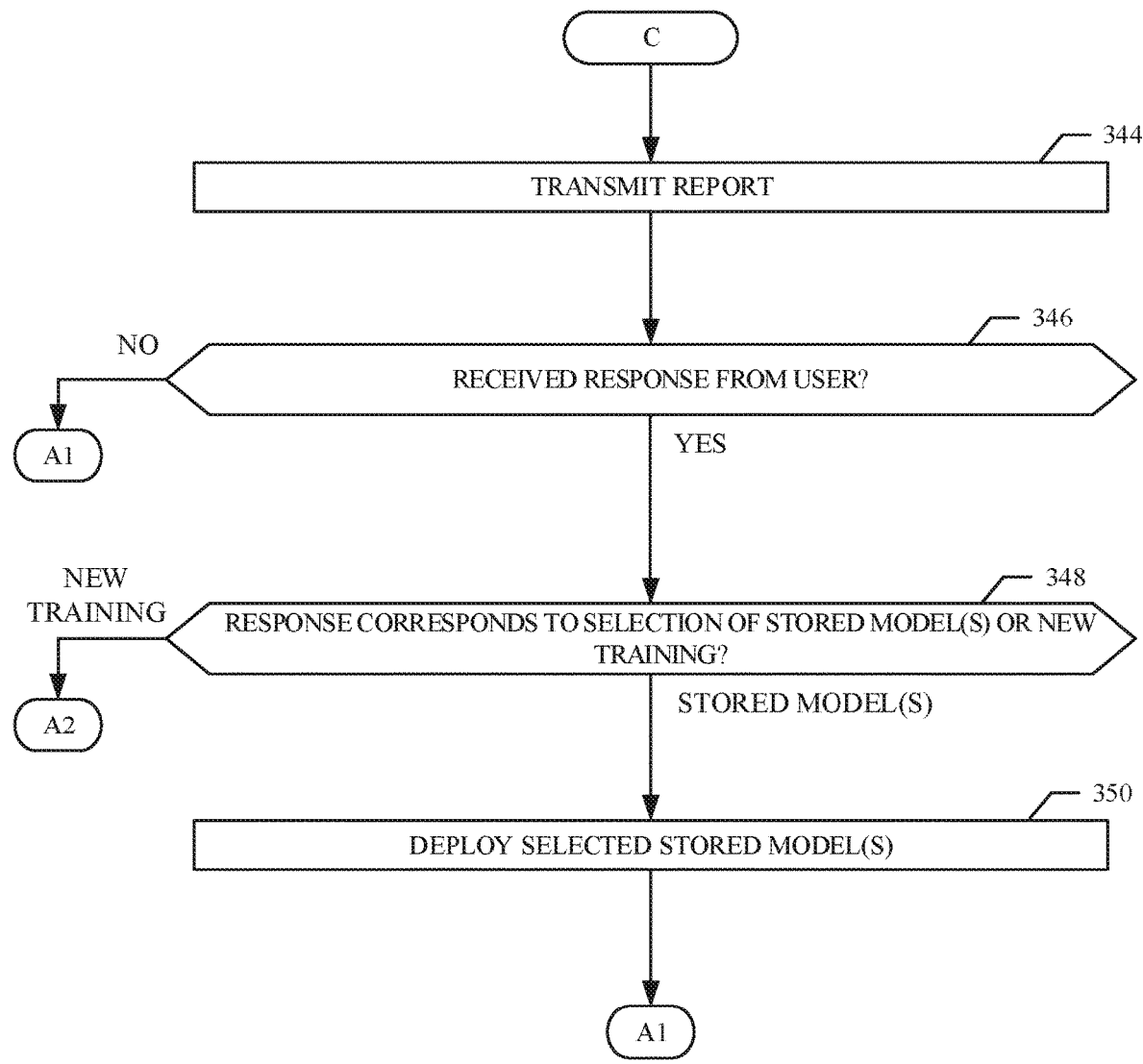

Flowcharts representative of example hardware logic, machine readable instructions, hardware implemented state machines, and/or any combination thereof for implementing the example model adaptor 110 of FIGS. 1 and/or 2 are shown in FIGS. 3A-3C. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIG. 3A-3C many other methods of implementing the example model adaptor 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3A-3C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second", etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 3A-3C illustrate an example flowchart representative of machine readable instructions 300 that may be executed to implement the example model adaptor 110 of FIG. 2 to train one or more models, monitor the one or more models, and/or transmit reports corresponding to the one or more models. Although the instructions 300 are described in conjunction with the example model adaptor 110 of FIG. 2, the instructions 300 may be described in conjunction with any type of model adaptor.

At block 302, the example interface(s) 200 obtains a request for a model from a user to classify malware. The interface(s) 200 may obtain the request from the processing device 108 locally (e.g., when the model adaptor 110 is implemented in the processing device 108) or from the network 106 (e.g., when the model adaptor 110 is implemented in the server 104 and/or another device). The request may include training data, user preferences, processing device capabilities, telemetry data, and/or any other data provided by the user about the processing device (e.g., industry, geolocation, etc.) and/or the type of malware to be classified. At block 304, the example interface(s) 200 obtains training data from the storage device(s) 204. The training data may be provided by the user and/or may be training data generated by an entity that owns and/or controls the server 104.

At block 306, the example filter 202 determines if the training data needs to be filtered. The training data may need to be filtered if some or all the training data is training data not received from the user, so that the training data is relevant to the request of the user and/or the processing device of the user. If the example filter 202 determines that the training data does not need to be filtered (block 306: NO), control continues to block 310. If the example filter 202 determines that the training data does need to be filtered (block 306: YES), the example filter 202 filters the training data according to the user and/or processing device characteristics (e.g., filtering out data that does not correspond to the industry, operating system, location, type of malware, etc. of the processing device 108) (block 308).

At block 310, the example model trainer 206 trains different models using the training data. As described above, the model trainer 206 may train different model types, models of varying complexities and/or structures, etc. to provide the user with a plurality of options for a malware classification model. The model trainer 206 may train models that consume more resources than the computing device 108 can handle (e.g., based on the telemetry data and/or capabilities of the processing device 108). In this manner, if at a later point in time the processing device 108 is upgraded, the model adaptor 110 can suggest a more accurate and/or faster model that the upgraded device can now handle. At block 312, the example report generator 212 generates and transmits (e.g., via the interface 200) a report indicating the characteristics of the trained models. For example, the report generator 212 generates a report that identifies the different trained models, the types of malware that are classified, classification accuracy of the trained models, the amount of one or more resources (e.g., processor resources, memory, etc.) needed to implement the trained models, the amount of memory needed to store one or more of the trained models, the speed of the trained models, etc. If the example model trainer 206 trains models that the processing device 108 does not have the capability to handle, the report generator 212 may remove these options from the report and/or may indicate that these options are beyond the capabilities of the processing device 108 (e.g., by indicating the capabilities and/or telemetry data of the processing device 108 and/or the amount of resource consumption to implement the corresponding models).

At block 314, the example model trainer 206 stores the trained model data corresponding to implementation of the trained models in the storage device(s) 204. In some examples, the model trainer 206 may transmit (e.g., using the interface(s) 200) the trained model data to the server 104 and/or another device to be stored externally. At block 316, the example interface(s) 200 deploys trained model data corresponding to implementation of the one or more model(s) selected by a user to the processing device 108 to implement the model based on the deployed trained model data using the model implementor 110. At block 318, the example model implementer(s) 208 determine(s) whether a trigger and/or event has occurred. A trigger or event may be a threshold amount of time, a request from a user, receiving more than a threshold amount of new training data, receiving telemetry data from the processing device 108, etc.

If the example model implementor(s) 208 determine(s) that a trigger and/or event has not occurred (block 318: NO), control returns to block 318 until a trigger and/or event does occur. If the example model implementor(s) 208 determine(s) that a trigger and/or event has occurred (block 318: YES), the example filter 202 and/or model implementor(s) 208 obtains the new training data from the storage device(s) 204 (block 320). For example, if the new training data is not provided by the user, the filter 202 obtains the new training data to filter out data that may not be relevant to the user. When new training data is received, the training data is stored in the storage device(s) 204.

At block 322, the example filter 202 filters the training data according to the user characteristics (e.g., industry of use, malware type to be classified, geolocation of the processing device 108, etc.). If the new training data is from the user, control may skip block 322. At block 324, the example model implementor(s) 208 obtains the trained model data corresponding to the implementation of the trained model(s) (e.g., previously selected by the user and deployed to the processing device 108) and applies the training data to the selected model(s). For example, the data and/or file of the new training data is input into a model that has been implemented using the trained model data to generate an output classification. At block 325, the example data comparator(s) 210 generate(s) results by comparing output classifications of the selected model(s) to the corresponding known classifications of the training data. The results may include the number of misclassifications (e.g., the number and/or percentage of output classifications that do not match the corresponding known classifications) At block 326, the example report generator 212 generates a report based on the results. The report may include the efficiency and/or efficacy of the user-selected model based on the total number of correct classifications and the total number of misclassifications. In some examples, if the results correspond to more than a threshold number and/or percentage of misclassifications when comparing the output classifications to the known classifications, the report generator may flag, or otherwise identify, that the deployed model has degraded by more than a threshold amount and/or otherwise indicate to the user that the model is outdated.

At block 328, the example data comparator(s) 210 determine(s) if the efficacy and/or accuracy of the user selected model(s) (e.g., based on a ratio and/or percentage of the misclassification and/or correct classifications of the model with the training data) satisfy(ies) a threshold. The threshold may be based on user preferences, manufacturer preferences, or preferences of the entity that owns or controls the server 104. If the example data comparator(s) 210 determine(s) that the efficacy and/or efficiency of the user selected model(s) satisfy the threshold (block 328: YES), control continues to block 334. If the example data comparator(s) 210 determine(s) that the efficacy and/or efficiency of the user selected model(s) do/does not satisfy the threshold (block 328: NO), the example model implementor(s) 208 implement(s) the remaining trained models based on the corresponding model data stored in the storage device(s) 204 and apply(ies) the training data to the models (block 330). At block 332, the example report generator 212 updates the report to include data related to the efficacy, efficiency, and/or any other information corresponding to the stored models. For example, the report generator 212 may update the report to include a suggestion to select another previously trained model whose efficacy satisfies the threshold. The report generator 212 may also update the report to include a suggestion to initiate the retraining of malware classification models. As described above, the data comparator(s) 210 determine(s) the efficacy and/or efficiency of the models by comparing the output classifications of the models to the known classifications of the models (e.g., the efficacy or efficiency for a model may be based on a ratio or percentage of correct classifications to misclassifications using the model).

At block 334, the example report generator 212 determines if the telemetry data for the processing device 108 is known. In some examples, a user may agree to have the processing device 108 provide telemetry data to the model adaptor 110 periodically, aperiodically, and/or based on a trigger. If the report generator 212 determines that the telemetry data for the processing device is not known (block 334: NO), control continues to block 344. If the report generator 212 determines that the telemetry data for the processing device is known (block 334: YES), the data comparator(s) 210 determine(s) if the telemetry data correspond to one or more of the stored models (block 336). For example, if the telemetry data reveals that the processing device 108 is using more than a first threshold amount of computing resources (e.g., overworked or overutilized), the data comparator 210 can attempt to identify stored models that utilize less computing resources that will cause the processing device 108 to use less than the first threshold amount of computing resources. If the telemetry data reveals that the processing device 108 is using less than a second threshold amount of computing resources (e.g., underworked or underutilized), the data comparator(s) 210 can attempt to identify stored models that utilize more computing resources that will cause the processing device 108 to use more than the second threshold amount of computing resources. The first and second thresholds may be based on the computing resources of the processing device 108, user preferences, manufacturer preferences, and/or the preferences of the entity that owns and/or controls the server 104.

If the example data comparator(s) 210 determine(s) that the telemetry data does not correspond to a stored model (block 336: NO), control continues to block 344. If the example data comparator(s) 210 determine(s) that the telemetry data corresponds to a stored model (block 336: YES), the model implementor(s) 208 apply(ies) the new training data to the corresponding stored model(s) (e.g., using the stored model data in the storage device(s) 204 to implement the model) (block 338). This step may be eliminated if already performed in conjunction with block 330. The stored models are tested with the new training data to ensure that the models still have sufficient efficacy and/or efficiency to classify malware for the user.

At block 340, the example data comparator(s) 210 determine if the efficacy and/or efficiency of the stored model(s) satisfy(ies) a threshold (e.g., by comparing output classifications of the models using the training data with the known classifications). If the example data comparator(s) 210 determine(s) none of the models have an efficacy and/or efficiency that satisfies the threshold (block 340: NO), control continues to block 344. If the example data comparator(s) 210 determine(s) that at least one of the models has an efficacy and/or efficiency that is above the threshold (block 340: YES), the example report generator 212 updates the report based on the characteristics of the corresponding stored model(s) (e.g., the model(s) that satisfy the threshold) (block 342). For example, the report generator 212 may include a suggestion in the report that suggests selection of the corresponding stored model(s) based on the telemetry data of the processing device 108. The characteristics may include the amount of computing resources used by the corresponding model, the amount of computing resources used by the currently deployed model, the potential effect on the computing resources of the processing device 108 if the corresponding model is deployed, the speed of the corresponding model, the efficiency of the corresponding model, and/or any other details related to the corresponding model or the functionality of the model.

At block 344, the example interface(s) 200 transmit(s) the report to a user interface to inform the user of efficacy of the deployed model and options for other models. The report may be transmitted to the processing device 108 (e.g., to be output by the processing device 108) and/or to another device of the user (e.g., another computer, phone, etc. as a popup, email, text, etc.). At block 346, the interface(s) 200 determine(s) if it has received a response from the user (e.g., after a threshold amount of time). If the user has not responded to the report (block 346: NO), control returns to block 318 until the next trigger and/or event occurs to initiate a new report. If the user has responded to the report (block 346: YES), the report generator 212 determines if the response corresponds to selection of a different stored model to be deployed or instruction to initiate training of new models (block 348).

If the example report generator 212 determines that the user response corresponds to new training (block 348: NEW TRAINING), control returns to block 304 and new malware classification models are trained. If the example report generator 212 determines that the user response corresponds to selection of different model(s) (block 348: STORED MODEL(S)), the example interface(s) 200 deploys the selected stored model(s) to the example processing device 108 (block 350) and control returns to block 318.

Figure 4:
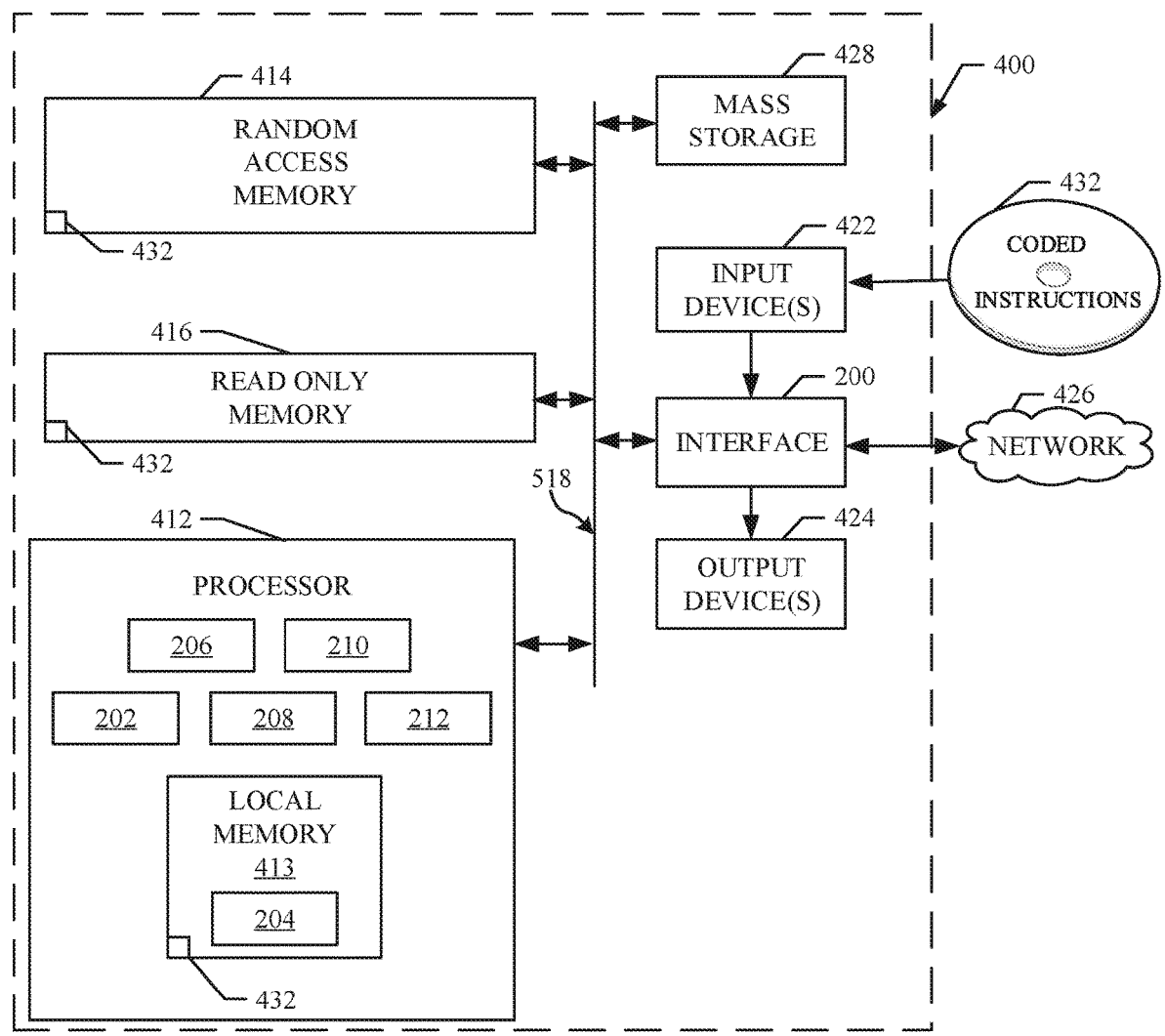
FIG. 4 is a block diagram of an example processing platform structured to execute the instructions of FIGS. 3A-3C to implement the example model adaptor of FIGS. 1 and/or 2.

FIG. 4 is a block diagram of an example processor platform 400 structured to execute the instructions of FIGS. 3 and/or 4 to implement the model adaptor 110 of FIG. 2. The processor platform 400 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example filter 202, the example model trainer 206, the example model implementor(s) 208, the example data comparator(s) 210, and the example report generator 212.

The processor 412 of the illustrated example includes a local memory 413 (e.g., a cache). In this example, the local memory 413 implements the example storage device(s) 204. However, the example volatile memory 414 and/or the example non-volatile memory 416 may implement the storage device(s) 204. The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 200. The interface circuit 200 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 200. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 200 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 200 of the illustrated example, thus, typically includes a graphics driver card, a graphics driver chip, and/or a graphics driver processor.

The interface circuit 200 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIGS. 3A-3C may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed that deploy and monitor artificial intelligence models to classify malware. The disclosed methods, apparatus and articles of manufacture provide a plurality of options to classify malware based on user preferences and/or computing device resources. In this manner, malware can be detected to protect the computing devices and data of a user. Because ML models degrade with time, examples disclosed herein continue to monitor the efficacy and/or efficiency of the deployed model(s) and provide options to updates based on the efficacy and/or efficiency of other models and/or the telemetry data of the processing devices of a user. Accordingly, the disclosed methods, apparatus and articles of manufacture are accordingly directed to one or more improvement(s) in the functioning of a computer by providing up-to-date malware protection.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for monitoring efficacy of artificial intelligence models, comprising:
    model trainer circuitry to train (a) a first artificial intelligence (AI) model using first training data and (b) a second AI model using the first training data, the second AI model having a structure corresponding to a consumption of more resources than the first AI model;
    interface circuitry to transmit model data to a processing device, the model data corresponding the first AI model to be implemented at the processing device;
    model implementor circuitry to locally apply second training data to the first AI model to generate output classifications, the second training data generated after generation of the first training data used to train the first AI model;
    comparator circuitry to compare the output classifications to known classifications of the second training data to determine an efficacy of the first AI model; and
    report generator circuitry to:
        select the second AI model based on (a) the efficacy of the first AI model and (b) a characteristic of the processing device while implementing the first AI model; and
        generate a report identifying the second AI model.

2. The apparatus of claim 1, wherein the report generator circuitry is to generate the report to identify that the first AI model is outdated when the comparison of the output classifications to the known classification of the second training data corresponds to more than a threshold percentage of misclassifications.

3. The apparatus of claim 1, wherein the model implementor circuitry is to locally apply the second training data to the first AI model after the model data is transmitted to the processing device.

4. The apparatus of claim 1, wherein the interface circuitry is to transmit the report to at least one of the processing device or another device.

5. The apparatus of claim 1, wherein the second AI model is different than the first AI model.

6. The apparatus of claim 1, wherein the model data is first model data, further including a storage device to store second model data corresponding to the second AI model in response to a user of the processing device not selecting the second AI model.

7. The apparatus of claim 1, wherein the efficacy of the first AI model is a first efficacy, the report generator circuitry to suggest the second AI model in the report based on a second efficacy of the second AI model when the first efficacy is below a threshold.

8. The apparatus of claim 1, wherein the report generator circuitry is to suggest the second AI model in the report based on telemetry data of the processing device.

9. At least one non-transitory computer readable storage medium comprising instructions for monitoring efficacy of artificial intelligence models, which cause programmable circuitry to at least:
    train a first artificial intelligence (AI) model using first training data;
    train a second AI model using the first training data, the second AI model having a structure corresponding to a consumption of more resources than the first AI model;
    cause transmission of first model data to a processing device, the first model data to enable implementation of the first AI model at the processing device;
    apply second training data to the first AI model to generate output classifications, the second training data generated after generation of the first training data used to train the first AI model;
    compare the output classifications to known classifications of the second training data to determine an efficacy of the first AI model; and
    identify the second AI model based on the efficacy of the first AI model, and on one or more characteristics of the processing device while implementing the first AI model; and
    cause transmission of second model data to the processing device, the second model data to enable implementation of the second AI model at the processing device.

10. The at least one computer readable storage medium of claim 9, wherein the instructions cause the programmable circuitry to generate a report to identify that the first AI model is outdated when the comparison of the output classifications to the known classification of the second training data corresponds to more than a threshold percentage of misclassifications.

11. The at least one computer readable storage medium of claim 9, wherein the instructions cause the programmable circuitry to apply the second training data to the first AI model after the first model data is transmitted to the processing device.

12. The at least one computer readable storage medium of claim 9, wherein the instructions cause the programmable circuitry to cause transmission of a report to at least one of the processing device or another device.

13. The at least one computer readable storage medium of claim 9, wherein the second AI model is different than the first AI model.

14. The at least one computer readable storage medium of claim 9, wherein the instructions cause the programmable circuitry to store the second model data corresponding to the second AI model in a storage device in response to a user of the processing device not selecting the second AI model.

15. The at least one computer readable storage medium of claim 9, wherein the efficacy of the first AI model is a first efficacy, the instructions to cause the programmable circuitry to suggest the second AI model based on a second efficacy of the second AI model.

16. The at least one computer readable storage medium of claim 9, wherein the instructions cause the programmable circuitry to suggest the second AI model based on telemetry data of the processing device.

17. A method for monitoring efficacy of artificial intelligence models, comprising:
    at a first point in time:
        training, by executing an instruction with programmable circuitry, a first artificial intelligence (AI) model using first training data;
        training, by executing an instruction with the programmable circuitry, a second AI model using the first training data, the second AI model having a structure corresponding to a consumption of more resources than the first AI model; and
        transmitting first model data to a processing device, the first model data corresponding to the first AI model; and at a second point in time after the first point in time:
    locally applying, by executing an instruction with the programmable circuitry, second training data to the first AI model to generate output classifications;
    comparing, by executing an instructions with the programmable circuitry, the output classifications to known classifications of the second training data to generate an efficacy of the first AI model;
    when the efficacy of the first AI model is below a threshold, selecting, by executing an instruction with the programmable circuitry, the second AI model based on a characteristic of the processing device while implementing the first AI model; and
    transmitting second model data corresponding to the second AI model.

18. The method of claim 17, further including generating a report identifying that the first AI model is outdated.

19. An apparatus for monitoring efficacy of artificial intelligence models, comprising:
    memory;
    programmable circuitry to execute computer readable instructions to:
        train a first artificial intelligence (AI) model using first training data;
        train a second AI model using the first training data, the second AI model having a structure corresponding to a consumption of more resources than the first AI model;
        cause transmission of model data to a processing device, the model data corresponding to an implementation of the first AI model at the processing device;
        apply second training data to the first AI model to generate output classifications, the second training data generated after generation of first training data used to train the first AI model;
        compare the output classifications to known classifications of the second training data to determine an efficacy of the first AI model;
        select the second AI model based on (a) the efficacy of the first AI model and (b) a characteristic of the processing device while implementing the first AI model; and
        generate a report suggesting the second AI model.

20. The apparatus of claim 19, wherein the circuitry is to identify that the first AI model is outdated when the comparison of the output classifications to the known classification of the second training data corresponds to more than a threshold percentage of misclassifications.

21. The apparatus of claim 19, wherein the programmable circuitry is to apply the second training data to the first AI model after the model data is transmitted to the processing device.

22. The apparatus of claim 19, wherein the programmable circuitry is to cause transmission of the report to at least one of the processing device or another device.

23. The apparatus of claim 19, wherein the second AI model is different type of AI model than the first AI model.

24. The apparatus of claim 19, wherein the programmable circuitry is to store model data corresponding to the second AI model in a storage device in response to a user of the processing device not selecting the second AI model.

25. The apparatus of claim 19, wherein the efficacy of the first AI model is a first efficacy, the programmable circuitry to suggest the second AI model based on a second efficacy of the second AI model when the first efficacy is below a threshold.

26. The apparatus of claim 19, wherein the programmable circuitry is to suggest the second AI model based on telemetry data of the processing device.

27. The apparatus of claim 1, further including model trainer circuitry to train the first AI model to determine whether a file is malware using first training data.

28. The at least one computer readable storage medium of claim 9, wherein the instructions cause the programmable circuitry to train the first AI model to determine whether a file is malware using first training data.

29. The apparatus of claim 19, wherein the programmable circuitry is to train the first AI model to determine whether a file is malware using first training data.

* * * * *

UNITED STATES PATENT AND TRADEMARK OFFICE
CERTIFICATE OF CORRECTION

PATENT NO. : 11,847,217 B2
APPLICATION NO. : 16/917402
DATED : December 19, 2023
INVENTOR(S) : Healy et al.

It is certified that error appears in the above-identified patent and that said Letters Patent is hereby corrected as shown below:

On the Title Page

In Item (72), delete "Mahon" and insert --Mahon Cork-- for the cities of Sorcha Healy, Gerard Murphy, and David McCormack.

Signed and Sealed this
Twentieth Day of February, 2024

Katherine Kelly Vidal
*Director of the United States Patent and Trademark Office*